United States Patent [19]
Doumani

[11] Patent Number: 5,829,931
[45] Date of Patent: Nov. 3, 1998

[54] REMOVABLE DEPTH GUIDE FOR ROTARY CUTTING TOOL

[75] Inventor: Robert S. Doumani, Hoffman Estates, Ill.

[73] Assignee: S-B Power Tool Company, Chicago, Ill.

[21] Appl. No.: 895,657

[22] Filed: Jul. 17, 1997

Related U.S. Application Data

[60] Provisional application No. 60/023,586 Aug. 9, 1996.

[51] Int. Cl.⁶ ..................................................... B23C 1/20
[52] U.S. Cl. ........................ 409/132; 409/218; 144/251.1; 408/14; 408/110; 408/241 S
[58] Field of Search ........................... 144/136.95, 251.1, 144/134.5, 371; 409/182, 181, 218, 204; 408/14, 113, 110, 241 S

[56] References Cited

U.S. PATENT DOCUMENTS

| | | |
|---|---|---|
| 125,642 | 4/1872 | Whitus . |
| 169,075 | 10/1875 | Batson . |
| 413,178 | 10/1889 | Doe . |
| 455,199 | 6/1891 | Goeb . |
| 1,479,325 | 10/1924 | Schubnel . |
| 2,216,988 | 10/1940 | Schmidt ................................. 408/113 |
| 2,937,544 | 5/1960 | Forgy et al. . |
| 3,443,479 | 5/1969 | Hawley et al. ......................... 409/182 |
| 4,521,145 | 6/1985 | Bieler . |
| 4,764,060 | 8/1988 | Khurana . |
| 4,949,463 | 8/1990 | Chen . |
| 5,078,557 | 1/1992 | McCracken ............................. 409/182 |
| 5,429,162 | 7/1995 | Bonnett ................................. 409/182 |
| 5,613,813 | 3/1997 | Winchester et al. .................... 409/182 |
| 5,671,789 | 9/1997 | Stolzer et al. ........................... 409/182 |

*Primary Examiner*—Daniel W. Howell
*Assistant Examiner*—Adesh Bhargava
*Attorney, Agent, or Firm*—Jones, Day, Reavis & Pogue

[57] ABSTRACT

A drywall cutting tool has a removable depth guide. The depth guide may be removed from and installed on the tool housing by rotating the guide relative to the tool. The use of a fastener or separate tool is not required. The depth guide may be adjusted for controlling the depth of penetration of the cutting element.

7 Claims, 4 Drawing Sheets

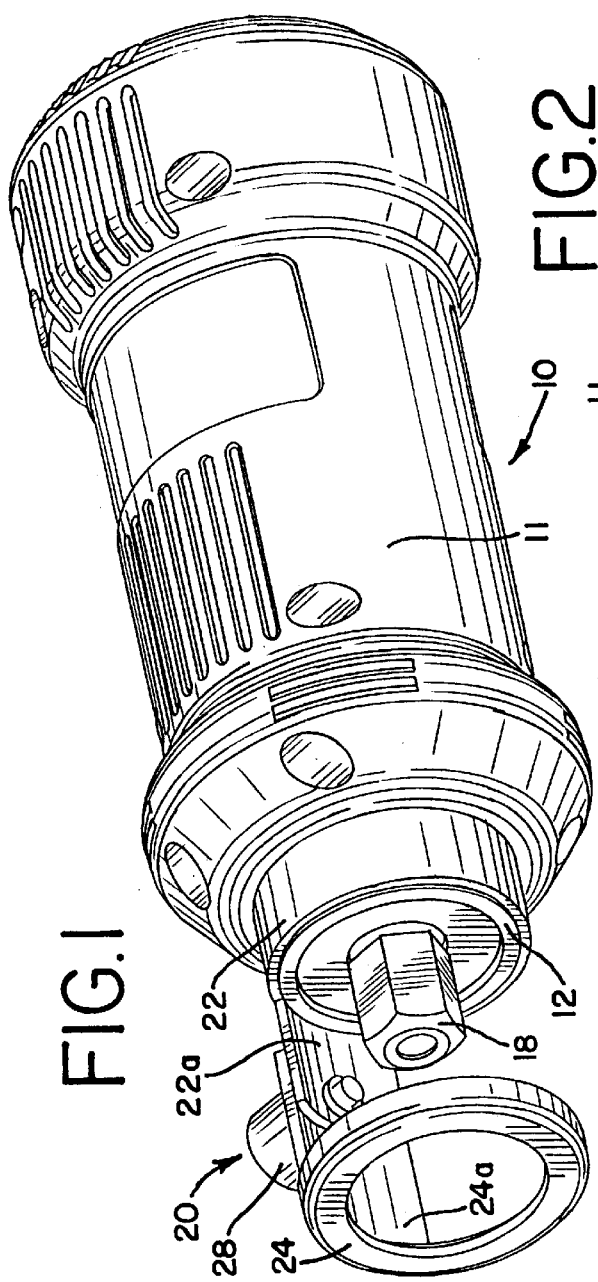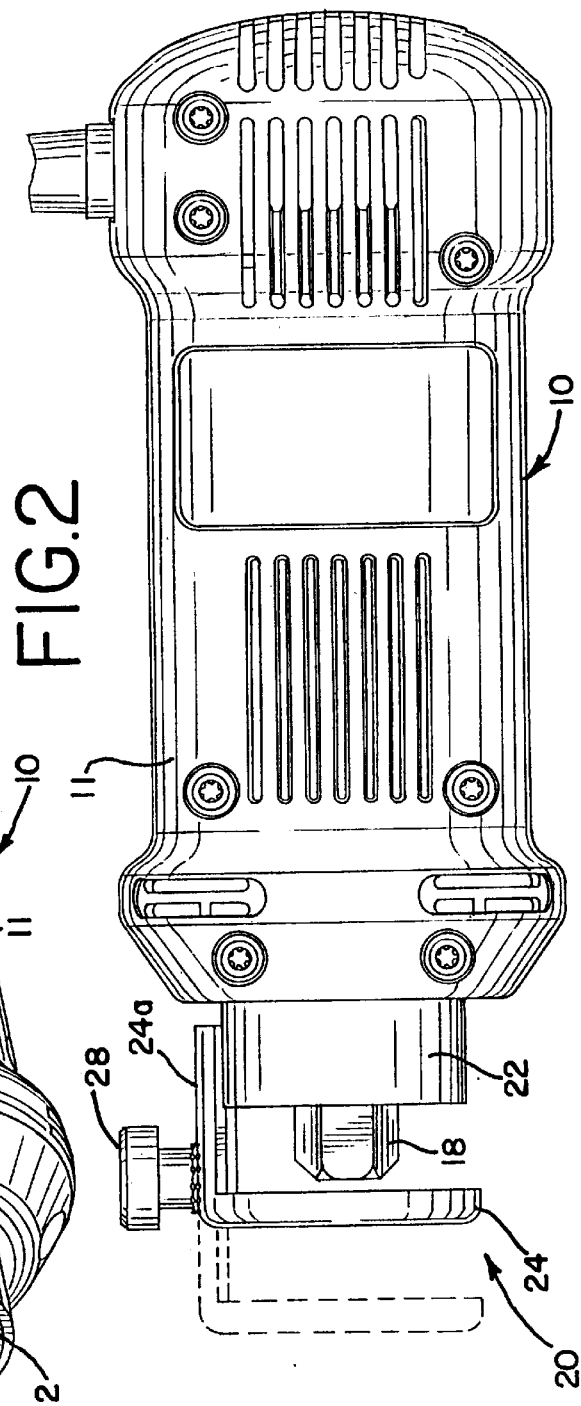

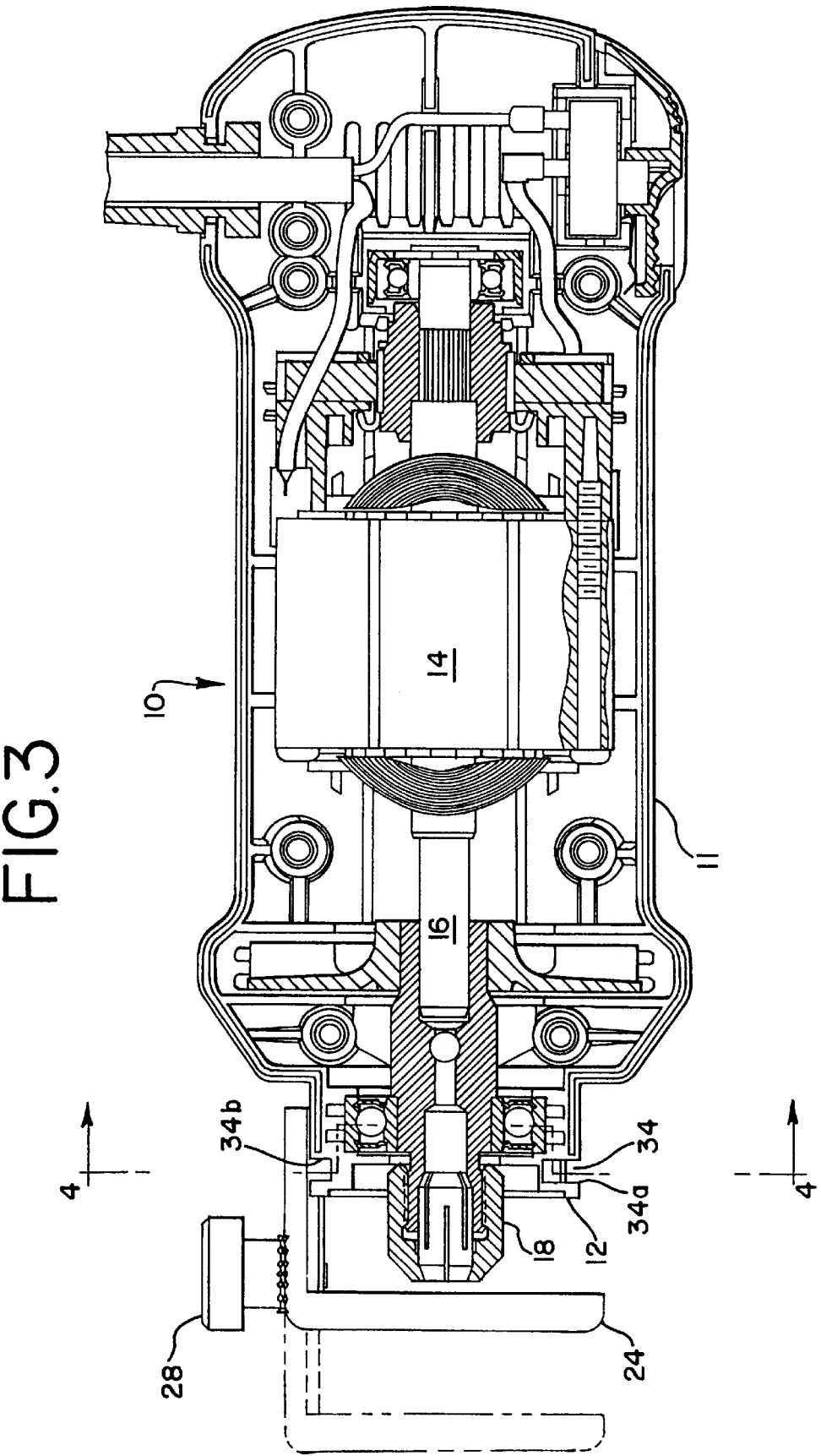

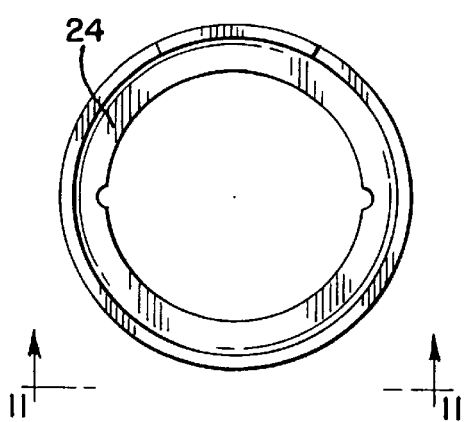
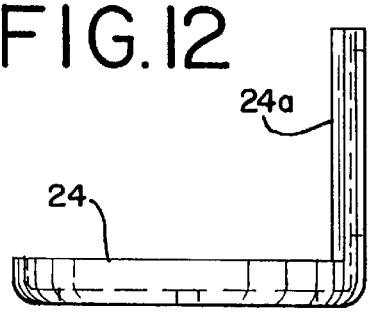
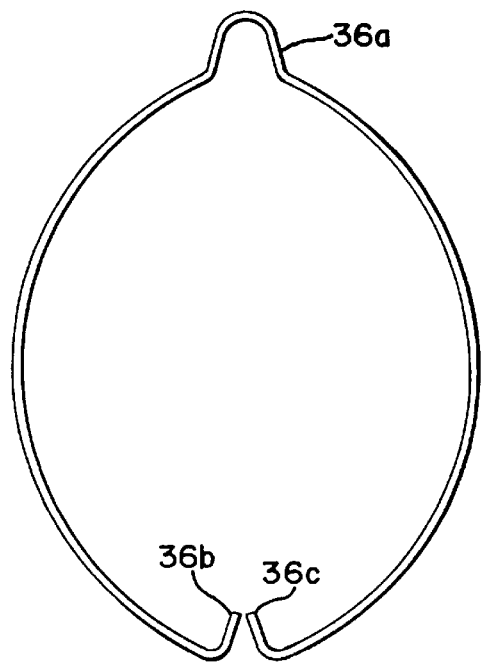
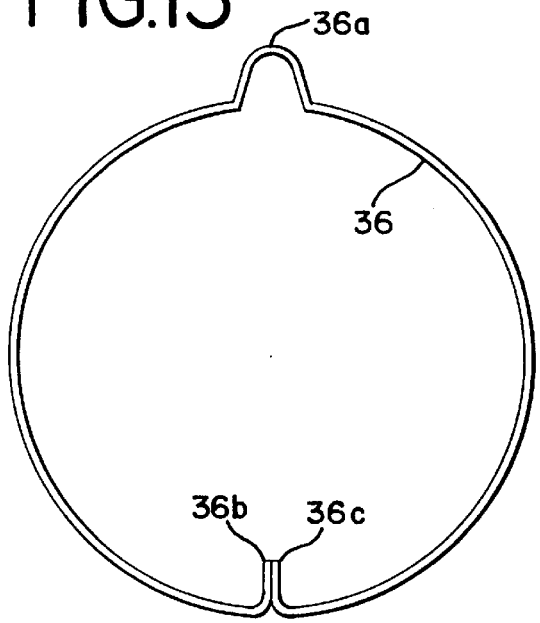
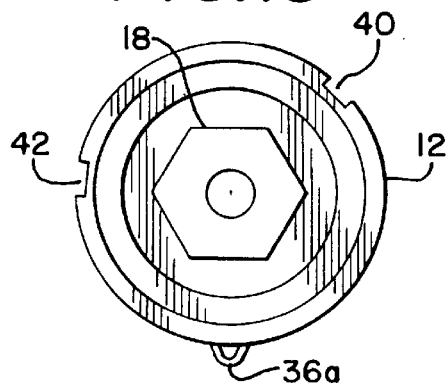

REMOVABLE DEPTH GUIDE FOR ROTARY CUTTING TOOL

This application claims the benefit of the filing date of U.S. provisional application No. 60/023,586, filed Aug. 9, 1996.

BACKGROUND OF THE INVENTION

This invention relates to a removable depth guide for a rotary cutting tool, such as a tool for cutting wood panels, drywall, foamboard, laminates, ceramic wall tile, acoustical tile, plastic and fiberglass, by way of examples. These tools are provided with bits that will form a hole and cut the material when the bit is moved in a plane perpendicular to the axis of rotation of the bit. Such tools may employ bits of the type disclosed in U.S. Pat. Nos. 5,143,490 and 5,323,823, assigned to Roto Zip Tool Corporation.

It is desirable to provide these tools with adjustable depth guides to control the amount of penetration of the cutting bit. For example, when cutting openings in drywall for electrical boxes, it is desirable to limit the amount of penetration of the bit to prevent the bit from damaging electrical conduits or fixtures located behind the drywall. In other instances, it may be desirable to limit the depth of the cut being made in the workpiece.

Although depth guides are desirable for the reasons just stated, these depth guides become a hindrance when cutting in an area where the workpiece, a drywall panel, for example, abuts a door jamb, window sill or other bordering object. In these instances the depth guide contacts the bordering material and prevents movement of the cutting bit to complete the desired cut. For this reason, prior art rotary cutting tools are provided with removable depth guides. However, these removable depth guides are held in place by a fastener, thus requiring the use of a separate tool, such as an Allen wrench, to remove the depth guide. An example of a rotary cutting tool with this type of removable depth guide is the Porter-Cable CUTOUT TOOL. These rotary cutting tools are disadvantageous in view of the time consuming operations involved in removing and reinstalling the depth guide when cutting near the edges of panels having bordering pieces.

SUMMARY AND OBJECTS OF THE INVENTION

The present invention provides a rotary cutting tool with a depth guide which can be readily removed and installed without the use of fasteners or tools.

A primary object of the invention is the provision of a removable depth guide which may be attached to and detached from the tool housing merely by rotating the depth guide relative to the tool housing.

Another object of the present invention is the provision of a removable depth guide of the type just described which is simple in construction thus lending itself to inexpensive manufacture and reliable operation.

These and other objects and advantages of the invention will be come apparent from the following specification.

DESCRIPTION OF THE DRAWINGS

FIG. 1 is an isometric view of a rotary cutting tool with the removable depth guide assembly of the present invention;

FIG. 2 is a top view of the tool;

FIG. 3 is a partial longitudinal section and top view of the tool;

FIG. 10 is a front view of the base plate forming part of the removable depth guide;

FIG. 11 is a view taken along the line 11—11 of FIG. 10;

FIG. 12 is a view taken along the line 12—12 of FIG. 11;

FIG. 13 is an enlarged elevational view of a collar spring forming part of the removable depth guide;

FIG. 14 is an enlarged elevational view of the collar spring in its relaxed condition; and FIG. 15 is a front view of the tool with the depth guide detached.

DESCRIPTION OF A PREFERRED EMBODIMENT

Figure 4:
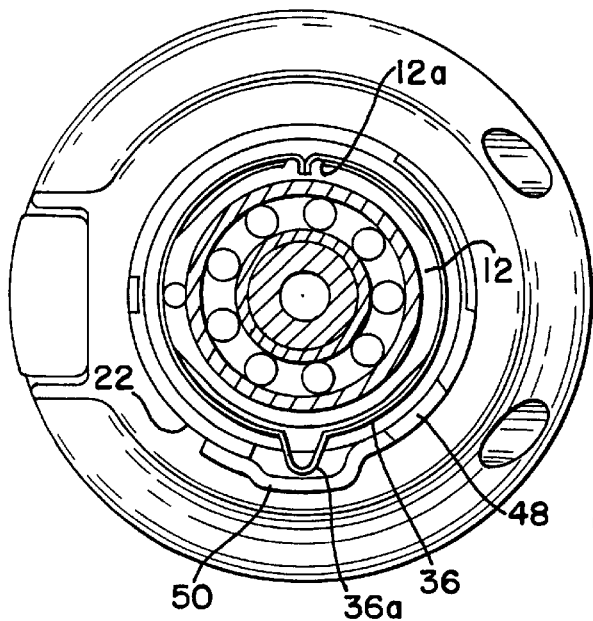
FIG. 4 is a section taken along the line 4—4 of FIG. 3.
Figure 5:
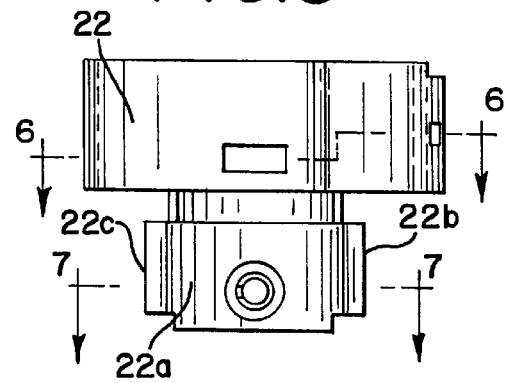
FIG. 5 is a plan view of a bracket collar forming part of the removable depth guide.

Referring to FIGS. 1–3, a rotary cutting tool, generally designated 10, includes a cylindrical housing 11 including a reduced-in-diameter cylindrical extension 12. Housing 11 mounts a suitable electric motor 14 having an output shaft 16; it will be understood that the shaft 16 drives the collet nut 18 which receives the shank of a rotary cutting bit which may be of the Roto Zip type referred to above.

Figure 7:
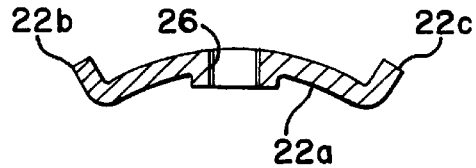
FIG. 7 is a section taken along the line 7—7 of FIG. 5.

A removable depth guide, generally designated 20, includes a bracket collar 22 and a base plate 24. The bracket collar 22 has an integral extension 22a including oppositely disposed guide formations 22b and 22c as best seen in FIG. 7. The bracket collar extension 22a includes a threaded aperture 26 for receiving a fastener 28.

Base plate 24 is annular in form and includes an integral extension 24a having a slot 30 (FIG. 11) for receiving the fastener 28. It will be understood that side edges of the extension 24a abut the guides 22b and 22c on the bracket which maintain the base plate properly oriented with respect to the bracket collar as the distance between the base plate and the bracket collar is varied. The base plate 24 may be adjusted with respect to the bracket collar 22 depending on the desired depth of penetration of the rotary cutting bit.

Referring to FIG. 3, it is seen that the cylindrical housing extension 12 includes an annular recess 34. The recess defines coaxial, forward and rearward annular walls 34a and 34b, respectively. The recess 34 receives a collar spring 36. The collar spring includes a detent formation 36a and inturned ends 36b and 36c as shown in FIGS. 13 and 14. As seen in FIG. 4, the cylindrical formation 12 includes an aperture 12a for receiving the inturned ends 36b and 36c of the collar spring.

Turning to FIG. 15, it is noted that the housing cylindrical portion 12 includes a first recess or notch 40 and a second recess or notch 42. It will be understood that these notches extend through the forward annular wall 34a.

Figure 6:
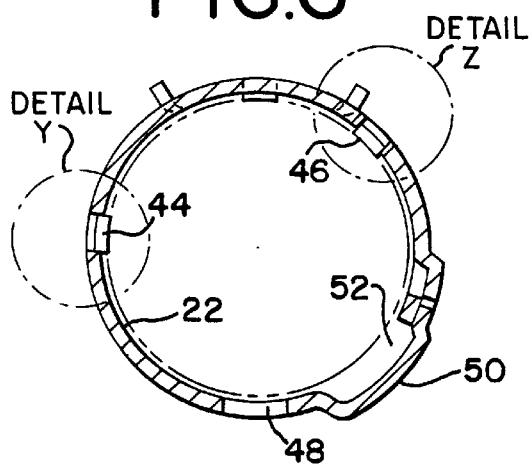
FIG. 6 is a section taken along the line 6—6 of FIG. 5.
Figure 8:
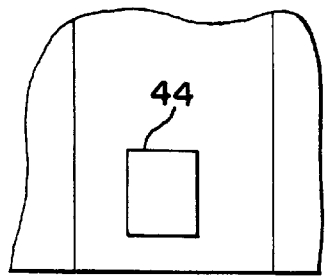
FIG. 8 is detail Y as seen in FIG. 6.
Figure 9:
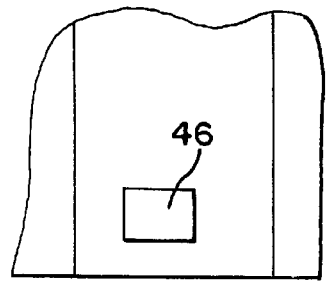
FIG. 9 is detail Z as seen in FIG. 6.

Referring to FIGS. 6 and 8, the bracket collar 22 includes a first inwardly extending projection 44. As seen in FIGS. 6 and 9, the bracket collar includes a second inwardly extending projection 46. As is apparent from FIGS. 4 and 6, the bracket collar includes an opening 48. As also noted in FIGS. 4 and 6, the bracket collar 22 includes a projection 50 defining a recess 52.

When it is desired to mount the bracket collar (with or without the base plate attached) to the tool, the bracket collar is held in substantial coaxial relationship with the collet nut 18. The bracket collar is manipulated by the hand of the operator for placing the projections 44 and 46 into alignment with the recesses or notches 40 and 42, respectively. The bracket collar is then pushed against the cylindrical formation 12 whereupon the projections 44 and 46 will pass through the notches 40 and 42 and will enter the annular recess 34. Rotation of the bracket collar in a clockwise direction, as seen in FIGS. 4 and 15, will cause the projections 44 and 46 to enter the recess 34 and engage the annular wall 34a for securing the bracket collar 22 to the cylindrical formation 12 of the tool. As the bracket collar is rotated in a clockwise direction as seen in FIG. 4, the bracket collar will cam the detent formation 36a inwardly until the opening 48 in the bracket collar comes into registry with the detent formation 36a whereupon that formation will enter the opening 48 in the bracket collar. Thus, the spring collar formation 36a acts as a detent for releasably holding the bracket collar to the cylindrical formation 12 of the tool.

When it is desired to remove the bracket collar, the same is rotated in a counterclockwise direction as seen in FIGS. 4 and 15 until the formations 44 and 46 come into alignment with the recesses 40 and 42. This rotation will force the detent 36a out of the opening 48 allowing the detent to be received within the recess 52, whereupon the bracket collar may be readily removed from the tool.

Accordingly, it is seen that the present invention provides a depth guide assembly permitting the depth guide to be readily and easily attached to and removed from the housing of the cutting tool, all without the use of fasteners or separate tools.

The foregoing description of a preferred embodiment is by way of example only. As will be apparent to those skilled in the art, the present invention is susceptible to many variations coming within the scope of the following claims.

I claim:

1. A removable depth guide assembly for a cutting tool of the type having a housing containing a motor connected to a collet for rotating the latter about an axis, said assembly comprising:

(a) said housing including engageable means adjacent said collet;

(b) a depth guide having a first part including engaging means adapted for interengagement with said engageable means when said first part is rotated relative to said housing in a first direction in a plane perpendicular to said axis for detachably securing the first part to the housing, rotation of the first part relative to the housing in a second direction opposite said first direction serving to disengage said engaging means from said engageable means thereby permitting separation of the first part from the housing;

(c) said first part including a first support element;

(d) said depth guide including a second part having a second support element engageable with said first support element;

(e) fastening means engaged with said first and second support elements for adjustably positioning said second part relative to said first part in a plurality of locations along said axis; and (f) said second part having a base plate contained in a plane perpendicular to said axis and including an opening for freely receiving a bit mounted in the collet.

2. The removable depth guide assembly according to claim 1 further defined by:

(a) said engageable means including an annular recess in said housing in coaxial relationship with said axis, said recess being defined by spaced, forward and rearward, coaxial annular walls, said engageable means also including at least one recess in said forward wall; and (b) said engaging means including at least one projection configured for (i) passing through said recess in response to movement of said first part toward said housing along said axis and (ii) engaging said forward wall in response to movement of the first part in said first direction.

3. The removable depth guide assembly according to claim 2 further defined by first and second detent formations on said housing and said first part for releasably holding said first part in a predetermined position after said first part has been rotated relative to the housing in said first direction.

4. A removable depth guide assembly according to claim 1 further defined by:

(a) said first part being in the form of an annular collar having a first arm constituting said first support element, said arm extending in parallel spaced relationship with said axis; and (b) said base plate of the second part having a second arm in sliding engagement with said first arm, one of said first and second arms including a slot parallel with said axis and the other of said first and second arms supporting said fastening means.

5. A removable depth guide assembly according to claim 2 further defined by:

(a) said first part being in the form of an annular collar having a first arm constituting said first support element, said arm extending in parallel spaced relationship with said axis; and (b) said base plate of the second part having a second arm in sliding engagement with said first arm, one of said first and second arms including a slot parallel with said axis and the other of said first and second arms supporting said fastening means.

6. A removable depth guide assembly according to claim 4 wherein said base plate is in the form of an annular member coaxial with said axis.

7. A removable depth guide assembly according to claim 5 wherein said base plate is in the form of an annular member coaxial with said axis.

* * * * *